(12) United States Patent
Sadasiva et al.

(10) Patent No.: US 12,526,693 B2
(45) Date of Patent: *Jan. 13, 2026

(54) FLEXIBLE SERVICE SELECTION USING ATSSS ON MULTIPLE 3GPP ACCESS NETWORKS

(71) Applicant: DISH Wireless L.L.C., Englewood, CO (US)

(72) Inventors: Venkatesh Bommasandra Sadasiva, Littleton, CO (US); Mehdi Alasti, Arlington, VA (US); Jingyi Zhou, Belle Mead, NJ (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,962

(22) Filed: Jun. 25, 2024

(65) Prior Publication Data

US 2024/0349120 A1 Oct. 17, 2024

Related U.S. Application Data

(63) Continuation of application No. 17/887,202, filed on Aug. 12, 2022, now Pat. No. 12,058,568.

(51) Int. Cl.
*H04W 28/10* (2009.01)
*H04L 47/2483* (2022.01)

(52) U.S. Cl.
CPC ......... *H04W 28/10* (2013.01); *H04L 47/2483* (2013.01)

(58) Field of Classification Search
CPC . H04W 28/10; H04W 28/12; H04W 28/0268; H04W 28/0925; H04W 48/18;
(Continued)

(56) References Cited

U.S. PATENT DOCUMENTS

2015/0103769 A1 4/2015 Kaichis et al.
2018/0041914 A1 2/2018 Zhang
(Continued)

FOREIGN PATENT DOCUMENTS

WO 2022050659 A1 3/2022

OTHER PUBLICATIONS

International Search Report and Written Opinion, dated Nov. 13, 2023, for International Patent Application No. PCT/US2023/029776. (17 pages).

(Continued)

*Primary Examiner* — Peter Chen
(74) *Attorney, Agent, or Firm* — Seed Intellectual Property Law Group LLP

(57) ABSTRACT

Disclosed is a method performed by a UE device that routes traffic to a 5G Core Network. The method includes receiving a first ATSSS rule including first traffic descriptor information corresponding to a first type of traffic for a first type of service and first steering mode information including a first network indicator corresponding to a first MNO, and a second ATSSS rule including second traffic descriptor information corresponding to a second type of traffic for a second type of service and second steering mode information including a second network indicator corresponding to a first MVNO or a second MNO; transmitting the first type of traffic for the first type of service a first 3GPP access network operated by the first MNO; and transmitting the second type of traffic for the second type of service to the first 3GPP access network operated by the first MNO.

18 Claims, 10 Drawing Sheets

(58) Field of Classification Search
CPC ..... H04W 40/00; H04W 76/11; H04W 76/12; H04W 76/15; H04W 76/16; H04W 88/06; H04L 47/2483; H04L 47/2491; H04L 45/24

See application file for complete search history.

(56) References Cited

U.S. PATENT DOCUMENTS

| | | |
|---|---|---|
| 2019/0306068 A1 | 10/2019 | Kiss et al. |
| 2021/0258817 A1 | 8/2021 | Kolding et al. |
| 2021/0258868 A1 | 8/2021 | Wong et al. |
| 2022/0110177 A1 | 4/2022 | Choksi et al. |
| 2022/0116327 A1 | 4/2022 | Salkintzis |
| 2022/0116822 A1 | 4/2022 | Sahin et al. |
| 2022/0247869 A1 | 8/2022 | Johnson et al. |
| 2023/0132058 A1 | 4/2023 | Youn et al. |
| 2023/0180057 A1 | 6/2023 | Tonesi et al. |
| 2023/0319634 A1 | 10/2023 | Youn et al. |
| 2023/0413114 A1 | 12/2023 | Ly et al. |
| 2024/0015562 A1 | 1/2024 | Youn et al. |
| 2024/0015590 A1 | 1/2024 | Shekhar et al. |
| 2024/0259857 A1 | 8/2024 | Zhu et al. |
| 2024/0381235 A1 | 11/2024 | Li et al. |

OTHER PUBLICATIONS

Huawei, HiSilicon, Lenovo, Motorola Mobility, "Clarification on threshold values," S2-2109096 (revision of S2-2108730), 3GPP TSG-WG SA2 Meeting #148E e-meeting, Elbonia, Nov. 11-15, 2021. (4 pages).

Huawei, HiSilicon, "KI #2, Sol #7: Update MP-QUIC solution to solve ENs," S2-200686 (revision of S2-2005474), 3GPP TSG-WG SA2 Meeting #140E e-meeting, Agenda Item: 8.6, Elbonia, Aug. 19-Sep. 1, 2020. (6 pages).

International Search Report and Written Opinion, mailed Nov. 2, 2023, for International Application No. PCT/US2023/029777. (15 pages).

Qualcomm, "Upper Layer TRaffic Aggregation and Steering, over dual 3GPP access (ULTRAS)," S1-220112 (revision of S1-yyxxxx), 3GPP SA WG1 Meeting #97e, Electronic Meeting, Feb. 14-24, 2022. (14 pages).

| Service ID | Service Type | Provider | Transport Type | Destination Port | Destination Address | Application Type |
|---|---|---|---|---|---|---|
| service-1 | voice | MVNO-1 | UDP | Port-1 | * | * |
| service-1 | voice | MVNO-1 | UDP | Port-2 | * | * |
| service-1 | voice | MVNO-1 | UDP | * | Address-1 | * |
| service-1 | voice | MVNO-1 | * | * | * | Application-1 |
| service-2 | video streaming | MVNO-1 | UDP | Port-3 | * | * |
| service-2 | video streaming | MVNO-2 | UDP | Port-4 | * | * |
| service-2 | video streaming | MVNO-2 | UDP | * | Address-2 | * |
| service-2 | video streaming | MVNO-2 | * | * | * | Application-2 |
| service-3 | Internet data | MNO | UDP | Port-5 | * | * |
| service-3 | Internet data | MNO | TCP | Port-5 | * | * |
| service-3 | Internet data | MNO | UDP | Port-6 | * | * |
| service-3 | Internet data | MNO | TCP | Port-6 | * | * |
| service-3 | Internet data | MNO | UDP | * | Address-3 | * |
| service-3 | Internet data | MNO | TCP | * | Address-3 | * |
| service-3 | Internet data | MNO | * | * | * | Application-3 |

*FIG. 6*

Access Traffic Steering, Switching & Splitting (ATSS) Rules

| |
|---|
| "Traffic Descriptor: UDP, DestPort Port-1", "Steering Mode: Active-Standby, Active=3GPP-2, Standby=3GPP-1" |
| "Traffic Descriptor: UDP, DestPort Port-2", "Steering Mode: Active-Standby, Active=3GPP-2, Standby=3GPP-1" |
| "Traffic Descriptor: UDP, DestAddr Address-1", "Steering Mode: Active-Standby, Active=3GPP-2, Standby=3GPP-1" |
| "Traffic Descriptor: Application-1", "Steering Mode: Active-Standby, Active=3GPP-2, Standby=3GPP-1" |
| "Traffic Descriptor: UDP, DestPort Port-3", "Steering Mode: Active-Standby, Active=3GPP-3, Standby=3GPP-1" |
| "Traffic Descriptor: UDP, DestPort Port-4", "Steering Mode: Active-Standby, Active=3GPP-3, Standby=3GPP-1" |
| "Traffic Descriptor: UDP, DestAddr Address-2", "Steering Mode: Active-Standby, Active=3GPP-3, Standby=3GPP-1" |
| "Traffic Descriptor: Application-2", "Steering Mode: Active-Standby, Active=3GPP-3, Standby=3GPP-1" |
| "Traffic Descriptor: UDP, DestPort Port-5", "Steering Mode: Active-Standby, Active=3GPP-1, Standby=non-3GPP-1" |
| "Traffic Descriptor: TCP, DestPort Port-5", "Steering Mode: Active-Standby, Active=3GPP-2, Standby=non-3GPP-1" |
| "Traffic Descriptor: UDP, DestPort Port-6", "Steering Mode: Active-Standby, Active=3GPP-1, Standby=non-3GPP-1" |
| "Traffic Descriptor: TCP, DestPort Port-6", "Steering Mode: Active-Standby, Active=3GPP-2, Standby=non-3GPP-1" |
| "Traffic Descriptor: UDP, DestAddr Address-3", "Steering Mode: Active-Standby, Active=3GPP-1, Standby=non-3GPP-1" |
| "Traffic Descriptor: TCP, DestAddr Address-3", "Steering Mode: Active-Standby, Active=3GPP-1, Standby=non-3GPP-1" |
| "Traffic Descriptor: Application-3", "Steering Mode: Active-Standby, Active=3GPP-1, Standby=non-3GPP-1" |

*FIG. 7*

FLEXIBLE SERVICE SELECTION USING ATSSS ON MULTIPLE 3GPP ACCESS NETWORKS

BACKGROUND

Access Traffic Steering, Switching & Splitting (ATSSS) is a feature included in Third Generation Partnership Project (3GPP) Fifth Generation (5G) New Radio (NR) Release 16, which can help to improve an end-user network experience. ATSSS can be used to select a best network, perform seamless handover, and perform network aggregation. ATSSS enables traffic steering across multiple accesses at a finer granularities than a Protocol Data Unit (PDU) session. ATSSS introduces the notion of a Multi Access PDU session, in which data traffic can be served over one or more concurrent accesses, including 3GPP access, trusted non-3GPP access, and untrusted non-3GPP access.

3GPP 5G NR Releases 16 and 17 only supports ATSSS across 3GPP and non-3GPP (trusted or untrusted) access networks. Future releases (e.g., 3GPP NR Release 18) may leverage ATSSS and Multi-Universal Mobile Telecommunications System (UMTS) Subscriber Identity Module (MUSIM) to enable intra operator ATSSS across two 3GPP access networks belonging to the same operator, which would enable a User Equipment (UE) device to have similar ATSSS capabilities across multiple 3GPP networks.

BRIEF SUMMARY

According to the present disclosure, a MUSIM-enabled User Equipment (UE) device can access two different 3GPP networks using ATSSS (e.g., 3GPP NR Release 18 ATSSS) along with multi-path connections (e.g., Multipath Transmission Control Protocol (TCP) (MPTCP) or Multipath Quick User Datagram Protocol (UPD) Internet Connection (MPQUIC) protocol). A User Plane Function (UPF) performs Layer 4 (e.g., TCP) optimization, terminates TCP sockets on a side of the UPF that is adjacent to a Data Network (DN), and initiates a new multipath (MPTCP) Layer 4 link toward the UE device. By using ATSSS and a multi-path connection protocol (e.g., MPTCP or MPQUIC) according to the present disclosure, a subscriber can have enhanced network access, for example, that results in in increased capacity, reduced latency, increased reliability, etc. In addition, using ATSSS and MPTCP according to the present disclosure, can result in enhanced cell edge performance and enhanced mobility.

According to the present disclosure, an end user can leverage ATSSS rules or policies to flexibly map selected types of services (e.g., voice, data, video streaming, etc.) to 3GPP access networks based on criteria, including technology (e.g., 5G/4G), price, service quality, and business relations, for example.

A method of routing traffic between a fifth-generation (5G) New Radio (NR) cellular telecommunication radio access network (RAN) and a 5G Core Network according to the present disclosure may be characterized as including: receiving, by a user equipment (UE) device, a plurality of Access Traffic Steering, Switching and Splitting (ATSSS) rules, including at least a first ATSSS rule and a second ATSSS rule, where the first ATSSS rule includes first traffic descriptor information corresponding to a first type of traffic for a first type of service and first steering mode information including a first network indicator corresponding to a first Mobile Network Operator (MNO), and where the second ATSSS rule includes second traffic descriptor information corresponding to a second type of traffic for a second type of service and second steering mode information including a second network indicator corresponding to a first Mobile Virtual Network Operator (MVNO); transmitting, by the UE device, the first type of traffic for the first type of service corresponding to the first traffic descriptor information included in the first ATSSS rule to a first 3GPP access network operated by the first MNO; and transmitting, by the UE device, the second type of traffic for the second type of service corresponding to the second traffic descriptor information included in the second ATSSS rule to the first 3GPP access network operated by the first MNO, where the first type of traffic and the second type of traffic are different, and where the first type of service and the second type of service are different.

The first type of service may be for a first one of data traffic, voice traffic, and video streaming traffic, and the second type of service may be for a second one of data traffic, voice traffic, and video streaming traffic.

The ATSSS rules may include a third ATSSS rule including third traffic descriptor information corresponding to a third type of traffic for the first type of service and third steering mode information including the first network indicator corresponding to the first MNO, and the method may further include transmitting, by the UE device, the third type of traffic for the first type of service corresponding to the third traffic descriptor information included in the third ATSSS rule to the first 3GPP access network operated by the first MNO. The ATSSS rules may include a fourth ATSSS rule including fourth traffic descriptor information corresponding to a fourth type of traffic for the second type of service and fourth steering mode information including the second network indicator corresponding to the first MVNO, and the method may further includes transmitting, by the UE device, the fourth type of traffic for the second type of service corresponding to the fourth traffic descriptor information included in the fourth ATSSS rule to the first 3GPP access network operated by the first MNO.

The ATSSS rules may include a third ATSSS rule including third traffic descriptor information corresponding to a third type of traffic for a third type of service and third steering mode information including a third network indicator corresponding to a second MVNO, and the method may further include transmitting, by the UE device, the third type of traffic for the third type of service corresponding to the third traffic descriptor information included in the third ATSSS rule to the first 3GPP access network operated by the first MNO.

The method may further includes receiving, by a computing device, service information indicating a plurality of services and a plurality of network operators respectively corresponding to the plurality of services, where the plurality of network operators includes the first MNO and the first MVNO; and generating, by the computing device, the ATSSS rules based on the service information.

The ATSSS rules may include a third ATSSS rule including third traffic descriptor information corresponding to a third type of traffic for a third type of service and third steering mode information including a third network indicator corresponding to a second MNO, and the method may further include transmitting, by the UE device, the third type of traffic for the third type of service corresponding to the third traffic descriptor information included in the third ATSSS rule to a second 3GPP access network operated by the second MNO.

The ATSSS rules may include a third ATSSS rule including third traffic descriptor information corresponding to a third type of traffic for a third type of service and third steering mode information including a third network indicator corresponding to a second MVNO, and the method may further include transmitting, by the UE device, the third type of traffic for the third type of service corresponding to the third traffic descriptor information included in the third ATSSS rule to a second 3GPP access network operated by a second MNO.

A method of routing traffic between a fifth-generation (5G) New Radio (NR) cellular telecommunication radio access network (RAN) and a 5G Core Network according to the present disclosure may be characterized as including: receiving, by a user equipment (UE) device, a plurality of Access Traffic Steering, Switching and Splitting (ATSSS) rules, including at least a first ATSSS rule and a second ATSSS rule, where the first ATSSS rule includes first traffic descriptor information corresponding to a first type of traffic for a first type of service and first steering mode information including a first network indicator corresponding to a first Mobile Network Operator (MNO), and where the second ATSSS rule includes second traffic descriptor information corresponding to a second type of traffic for a second type of service and second steering mode information including a second network indicator corresponding to a second MNO; transmitting, by the UE device, the first type of traffic for the first type of service corresponding to the first traffic descriptor information included in the first ATSSS rule to a first 3GPP access network operated by the first MNO; and transmitting, by the UE device, the second type of traffic for the second type of service corresponding to the second traffic descriptor information included in the second ATSSS rule to a second 3GPP access network operated by the second MNO, where the first type of traffic and the second type of traffic are different, and where the first type of service and the second type of service are different.

The first type of service may be for a first one of data traffic, voice traffic, and video streaming traffic, and the second type of service may be for a second one of data traffic, voice traffic, and video streaming traffic.

The ATSSS rules may include a third ATSSS rule including third traffic descriptor information corresponding to a third type of traffic for the first type of service and third steering mode information including the first network indicator corresponding to the first MNO, and the method may further include transmitting, by the UE device, the third type of traffic for the first type of service corresponding to the third traffic descriptor information included in the third ATSSS rule to the first 3GPP access network operated by the first MNO. The ATSSS rules may include a fourth ATSSS rule including fourth traffic descriptor information corresponding to a fourth type of traffic for the second type of service and fourth steering mode information including the second network indicator corresponding to the second MNO, and the method may further include transmitting, by the UE device, the fourth type of traffic for the second type of service corresponding to the fourth traffic descriptor information included in the fourth ATSSS rule to the second 3GPP access network operated by the second MNO.

The first steering mode information included in the first ATSSS rule may further include a third network indicator corresponding to a third MNO, the second steering mode information included in the second ATSSS rule may further include the third network indicator corresponding to the third MNO, and the method may further include: before or after the transmitting, by the UE device, the first type of traffic for the first type of service corresponding to the first traffic descriptor information included in the first ATSSS rule to a first 3GPP access network operated by the first MNO, transmitting, by the UE device, the first type of traffic for the first type of service corresponding to the first traffic descriptor information included in the first ATSSS rule to a third 3GPP access network operated by the third MNO; and before or after the transmitting, by the UE device, the second type of traffic for the second type of service corresponding to the second traffic descriptor information included in the second ATSSS rule to the second 3GPP access network operated by the second MNO, transmitting, by the UE device, the second type of traffic for the second type of service corresponding to the second traffic descriptor information included in the second ATSSS rule to the third 3GPP access network operated by the third MNO. The first MNO and the second MNO may be roaming partners of the third MNO.

The method may further include receiving, by a computing device, service information indicating a plurality of services and a plurality of network operators respectively corresponding to the plurality of services, where the plurality of network operators includes the first MNO and the second MNO; and generating, by the computing device, the ATSSS rules based on the service information.

A User Equipment (UE) device that routes traffic between a fifth-generation (5G) New Radio (NR) cellular telecommunication radio access network (RAN) and a 5G Core Network according to the present disclosure may be characterized as including: at least one memory that stores computer executable instructions; and at least one processor that executes the computer executable instructions to cause actions to be performed, the actions including: receive a plurality of Access Traffic Steering, Switching and Splitting (ATSSS) rules, including at least a first ATSSS rule and a second ATSSS rule, where the first ATSSS rule includes first traffic descriptor information corresponding to a first type of traffic for a first type of service and first steering mode information including a first network indicator corresponding to a first Mobile Network Operator (MNO), and where the second ATSSS rule includes second traffic descriptor information corresponding to a second type of traffic for a second type of service and second steering mode information including a second network indicator corresponding to a first Mobile Virtual Network Operator (MVNO); transmit the first type of traffic for the first type of service corresponding to the first traffic descriptor information included in the first ATSSS rule to a first 3GPP access network operated by the first MNO; and transmit the second type of traffic for the second type of service corresponding to the second traffic descriptor information included in the second ATSSS rule to the first 3GPP access network operated by the first MNO, where the first type of traffic and the second type of traffic are different, and where the first type of service and the second type of service are different.

The first type of service may be for a first one of data traffic, voice traffic, and video streaming traffic, and the second type of service may be for a second one of data traffic, voice traffic, and video streaming traffic.

The ATSSS rules may include a third ATSSS rule including third traffic descriptor information corresponding to a third type of traffic for the first type of service and third steering mode information including the first network indicator corresponding to the first MNO, and the actions may include transmit the third type of traffic for the first type of service corresponding to the third traffic descriptor information included in the third ATSSS rule to the first 3GPP access network operated by the first MNO. the ATSSS rules may include a fourth ATSSS rule including fourth traffic descriptor information corresponding to a fourth type of traffic for the second type of service and fourth steering mode information including the second network indicator corresponding to the first MVNO, and the actions may include transmit the fourth type of traffic for the second type of service corresponding to the fourth traffic descriptor information included in the fourth ATSSS rule to the first 3GPP access network operated by the first MNO.

The ATSSS rules may include a third ATSSS rule including third traffic descriptor information corresponding to a third type of traffic for a third type of service and third steering mode information including a third network indicator corresponding to a second MVNO, and the actions may include transmit the third type of traffic corresponding to the third traffic descriptor information included in the third ATSSS rule to the first 3GPP access network operated by the first MNO included in the first ATSSS rule.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 6 shows an example of service information that many be used to generate Access Traffic Steering, Switching & Splitting (ATSSS) rules in accordance with embodiments described herein.

FIG. 7 shows an example of that many be used to generate ATSSS rules that may be generated from the service information shown in FIG. 6 in accordance with embodiments described herein.

DETAILED DESCRIPTION

Figure 1:
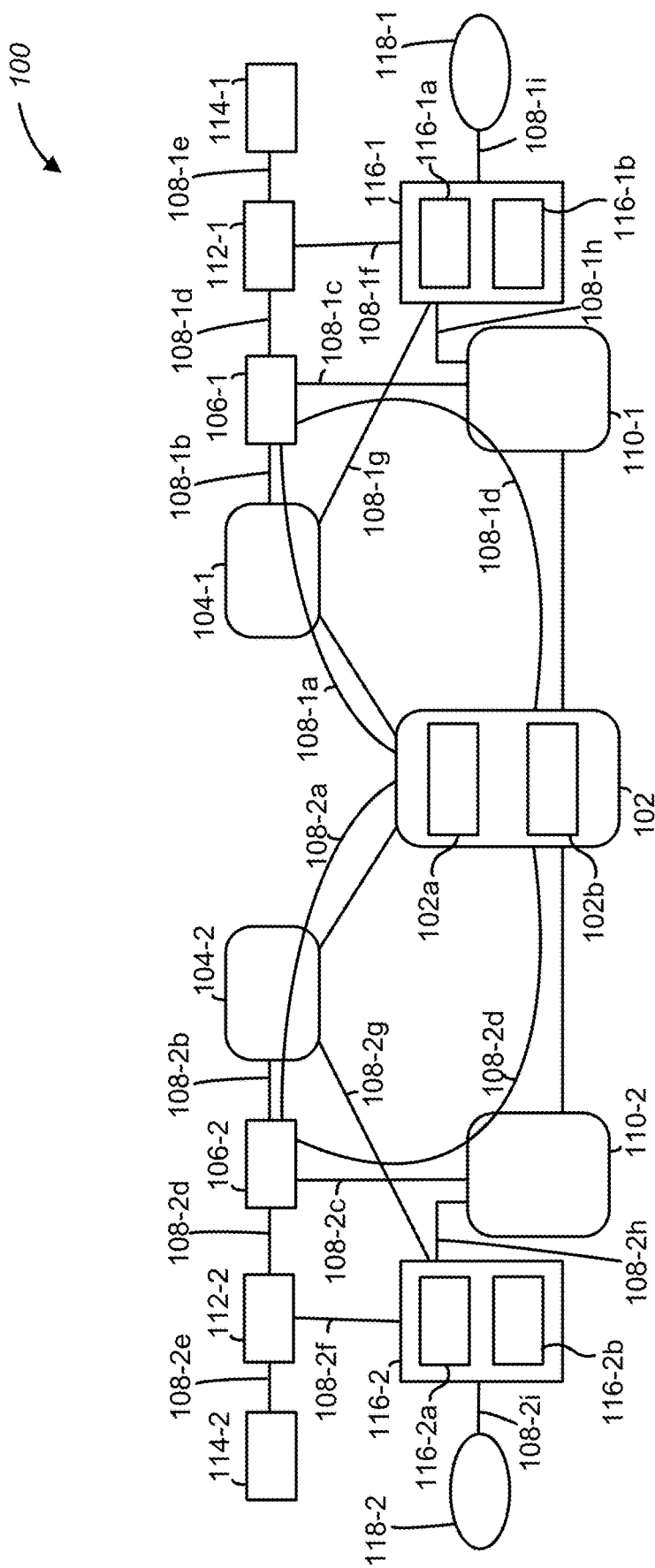
FIG. 1 is a block diagram illustrating a system in accordance with embodiments described herein.

FIG. 1 is a block diagram illustrating a communication system 100 in accordance with embodiments described herein. The communication system 100 include a User Equipment (UE) device 102 that can simultaneously be communicatively coupled to two 3GPP access networks, including 3GPP access network 104-1 and 3GPP access network 104-2. The UE device 102 includes a transport layer module 102a and an Access Traffic Steering Switching and Splitting (ATSSS) Lower Layer (LL) module 102b. In one or more implementations, the transport layer module 102a causes the UE device 102 to perform MPTCP according to Request for Comments (RFC) 8684 from the Internet Engineering Task Force (IETF). MPTCP is compatible with legacy TCP hardware (e.g., creates no issues for firewalls, etc.), enables paths to be added and removed (e.g., by an application) to handle connection loss, supports fair congestion control strategy between different links, uses sub-flows with multiple standard TCP connections, and handles congestion control and reliability using a modified retransmission protocol. In one or more implementations, the transport layer module 102a causes the UE device 102 to perform MPQUIC from the IETF. MPQUIC is connectionless (e.g., can be used with User Datagram Protocol (UDP) traffic), is secure (e.g., can be used with Transport Layer Security (TLS) 1.3) and can be used with advanced traffic (e.g., Hypertext Transfer Protocol (HTTP) 2 (HTTP2) traffic). In one or more implementations, the ATSSS-LL module 102b causes the UE device 102 to perform ATSSS according to 3GPP Technical Specification (TS) 23.501 (Release 18).

The 3GPP access network 104-1 is communicatively coupled to an Access and Mobility Management Function (AMF) device 106-1, which is communicatively coupled to a non-3GPP access network 110-1 and a Session Management Function (SMF) device 112-1. The UE device 102 communicates with the AMF device 106-1 using an N1 interface 108-1a. The 3GPP access network 104-1 communicates with the AMF device 106-1 using an N2 interface 108-1b. The AMF device 106-1 communicates with the non-3GPP access network 110-1 using an N2 interface 108-1c. The AMF device 106-1 communicates with the SMF device 112-1 using an N11 interface 108-1d.

The SMF device 112-1 is communicatively coupled to a Policy Control Function (PCF) device 114-1 and a User Plane Function (UPF) device 116-1. The UPF device 116-1 is communicatively coupled to the 3GPP access network 104-1, the non-3GPP access network 110-1, and a Data Network (DN) device 118-1. The UPF device 116-1 includes an MPTCP proxy module 116-1a and a Protected Management Frames (PMF) module 116-1b. In one or more implementations, the MPTCP proxy module 116-1a causes the UPF device 116-1 to perform MPTCP proxy functionality according to RFC 8684. In one or more implementations, the PMF device 116-1b causes the UPF device 116-1 to perform PMF functions according to a standard defined by the WiFi Alliance.

The SMF device 112-1 communicates with the PCF device 114-1 using an N7 interface 108-1e. The SMF device 112-1 communicates with the UPF device 116-1 using an N4 interface 108-1f. The UPF device 116-1 communicates with the 3GPP access network 104-1 using an N4 interface 108-1g. The UPF device 116-1 communicates with the non-3GPP access network 110-1 using an N3 interface 108-1h. The UPF device 116-1 communicates with the DN 118-1 using an N6 interface 108-1i.

The 3GPP access network 104-2 is communicatively coupled to an AMF device 106-2, which is communicatively coupled to a non-3GPP access network 110-2 and a SMF device 112-2. The UE device 102 communicates with the AMF device 106-2 using an N1 interface 108-2a. The 3GPP access network 104-2 communicates with the AMF device 106-2 using an N2 interface 108-2b. The AMF device 106-2 communicates with the non-3GPP access (WiFi) network 110-2 based on Non-3GPP Inter-Working Function (N3IWF) using an N2 interface 108-2c. The AMF device 106-2 and the SMF device 112-2 are not involved with the non-3GPP access (WiFi) network 110-2 based on Evolved Packet Data Gateway (ePDG). The AMF device 106-2 communicates with the SMF device 112-2 using an N11 interface 108-2d.

The SMF device 112-2 is communicatively coupled to a PCF device 114-2 and a UPF device 116-2. The UPF device 116-2 is communicatively coupled to the 3GPP access network 104-2, the non-3GPP access network 110-2, and a DN 118-2. The UPF device 116-2 includes an MPTCP proxy module 116-2a and a PMF module 116-2b. In one or more implementations, the MPTCP proxy module 116-2a causes the UPF device 116-2 to perform MPTCP proxy functionality according to RFC 8684. In one or more implementations, the PMF device 116-2b causes the UPF device 116-2 to perform PMF functions according to a standard defined by the WiFi Alliance.

The SMF device 112-2 communicates with the PCF device 114-2 using an N7 interface 108-2c. The SMF device 112-2 communicates with the UPF device 116-2 using an N4 interface 108-2f. The UPF device 116-2 communicates with the 3GPP access network 104-2 using an N4 interface 108-2g. The UPF device 116-2 communicates with the non-3GPP access network 110-2 based on N3IWF using an N3 interface 108-2h and for the non-3GPP access network 110-2 based on ePDG using an S2b interface. The UPF device 116-2 communicates with the DN 118-2 using an N6 interface 108-2i.

In the example of FIG. 1, the 3GPP access network 104-1, the AMF device 106-1, the non-3GPP access network 110-1, the SMF device 112-1, the PCF device 114-1, the UPF device 116-1, and the DN 118-1 are operated by a first mobile network operator (e.g., DISH Network, Verizon), and the 3GPP access network 104-2, the AMF device 106-2, the non-3GPP access network 110-2, the SMF device 112-2, the PCF device 114-2, the UPF device 116-2, and the DN 118-2 are operated by a second mobile network operator (e.g., AT&T, T-Mobile). In addition, the UE device 102 is operated by a subscriber of the first mobile network operator. In one or more embodiments, the AMF device 106-1, the SMF device 112-1, the PCF device 114-1, and the UPF device 116-1, are implemented in a public cloud computing environment (e.g., Amazon Web Services (AWS)).

The first mobile network operator configures and pushes ATSSS rules to the UE device 102. In one or more implementations, ATSSS rules are preconfigured in the UE device 102. In one or more implementations, the PCF device 114-1 configures ATSSS rules in the UE device 102. The ATSSS rules dictates how traffic to and from the UE device 102 should be routed through 3GPP and non-3GPP access networks, such as the 3GPP access network 104-1 and the non-3GPP access network 110-1. The ATSSS rules are stored by both the UE device 102 and the SMF device 112-1. The ATSSS rules are used by the UE device 102 and the SMF device 112-1 to perform steering functions. The steering functions include higher layer steering functions and lower layer steering functions. In one or more implementation, the higher layer steering functions are performed using MPTCP on Layer 4. In one or more implementation, the lower layer steering functions include placing the access networks in an active state or a standby state, determining a shortest round trip time for traffic, performing load balancing across the access networks, and performing priority based routing based on a higher priority being assigned to one of the access networks.

Figure 2:
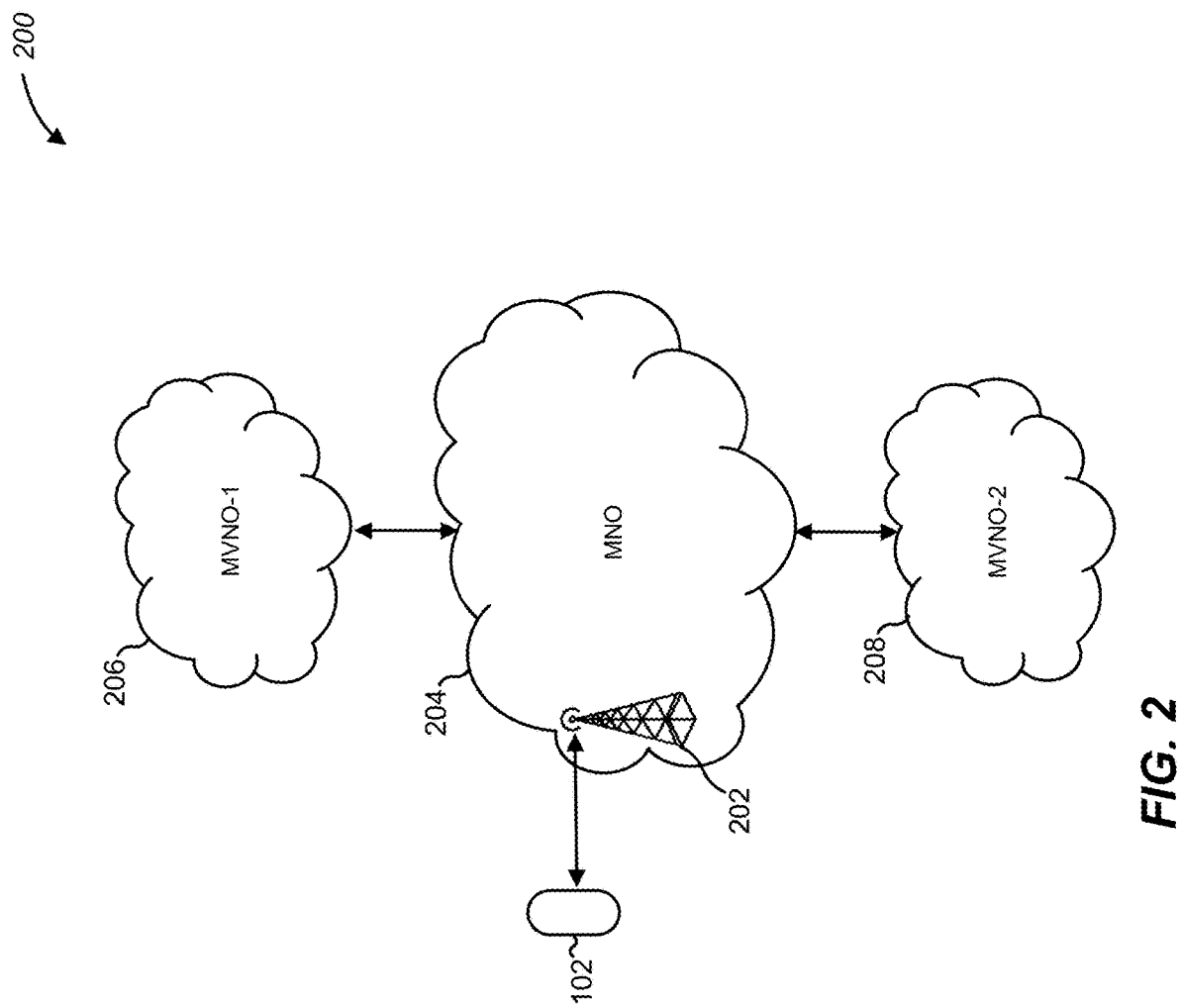
FIG. 2 is a diagram for explaining operation of a system in accordance with embodiments described herein.

FIG. 2 is a diagram for explaining operation of a communication system in accordance with embodiments described herein. More particularly, FIG. 2 shows a communication system 200 that includes a User Equipment (UE) device 102 that communicates with a 5G NR gNodeB (gNB) device (e.g., base station device) 202. The gNB device 202 is part of a 3GPP access network 204 that is operated by a Mobile Network Operator (MNO) (e.g., DISH Network). The MNO has business relation with two Mobile Virtual Network Operators (MVNOs) (e.g., Boost Mobile, Metro by T-Mobile), which are wireless providers that offer coverage to consumers using the MNO's infrastructure. Accordingly, the 3GPP access network 204 operated by the MNO communicates with a 5G network 206 operated by a first MVNO or MVNO-1 (e.g., Boost Mobile) and a 5G network 208 operated by a second MVNO or MVNO-2 (e.g., Metro by T-Mobile)

The first MVNO (MVNO-1) and the second MVNO (MVNO-2) offer different services with different prices, which may be lower than the prices of services offered by the MNO. Accordingly, an end user can subscribe to a first type of service (e.g., voice) from the first MVNO (MVNO-1), a second type of service (e.g., video streaming) from the second MVNO (MVNO-2), and a third type of service (e.g., Internet data) from the MNO, based on criteria such as price, service quality, or business relationship. For example, the second MVNO (MVNO-2) may only offer an inexpensive video streaming type of service, while the first MVNO (MVNO-1) offers all types of services but with higher prices. Accordingly, the end user to pick and choose different types of services (e.g., voice, video streaming, Internet streaming, etc.) and corresponding service providers (e.g., the MNO, the first MVNO (MVNO-1), the second MVNO (MVNO-2)) to optimize services based on the prices.

Figure 3:
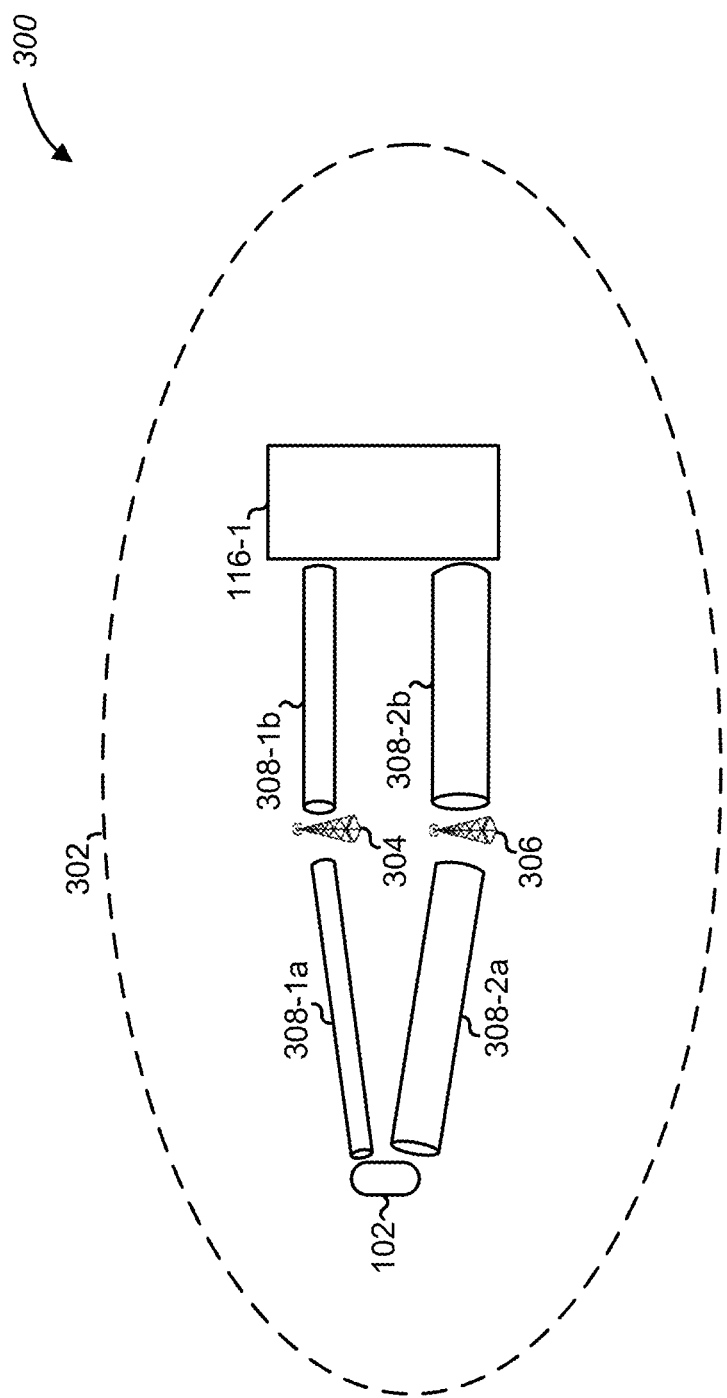
FIG. 3 is another diagram for explaining operation of a system in accordance with embodiments described herein.

FIG. 3 is another diagram for explaining operation of a communication system in accordance with embodiments described herein. In the example of FIG. 3, assume that a first mobile network operator (MNO) (e.g., DISH Network) has multiple roaming partners including a second MNO (e.g., Verizon) and a third MNO (e.g., T-Mobile). Also, assume that the third MNO has a better Internet 5G network in a geographic region (e.g., United States of America) that can deliver higher throughput Internet access than the first MNO and the second MNO. Further, assume that the second MNO has a more robust voice service in the U.S. with better coverage and lower call drops than the first MNO and the third MNO.

FIG. 3 shows an area 300 that includes a coverage area 302 including a 5G NR gNodeB (gNB) device (e.g., base station device) 304 that is operated by the second MNO, and a 4G eNodeB (eNB) device (e.g., base station device) 306 that is operated by the third MNO. In the example of FIG. 3, assume that a subscriber to the first MNO, which uses a MUSIM-enabled User Equipment (UE) device 102, has moved out of a coverage area (not shown) provided by the first MNO to the coverage area 302. The UE device 102 uses ATSSS rules to select the gNB device 304 to send a first type of traffic for a first type of service to a User Plane Function (UPF) device 116-1 operated by the first MNO via a communication link 308-1a. The UPF device 116-1 operated by the first MNO uses the ATSSS rules to select the device gNB device 304 to send the first type of traffic for the first type of service to the UE device 102 via a communication link 308-1b. Also, the UE device 102 uses the ATSSS rules to select the eNB device 306 to send a second type of traffic for a second type of service to the UPF device 116-1 operated by the first MNO via a communication link 308-2a. The UPF device 116-1 operated by the first MNO uses the ATSSS rules to select the eNB device 306 to the second type of traffic for the second type of service to the UE device 102 via a communication link 308-2*b*. In the example of FIG. 3, the second MNO and the third MNO follow home-routed roaming, so both a Data Network Name (DNN) and a voice DNN are anchored at a 5G Core network of the first MNO.

Figure 4:
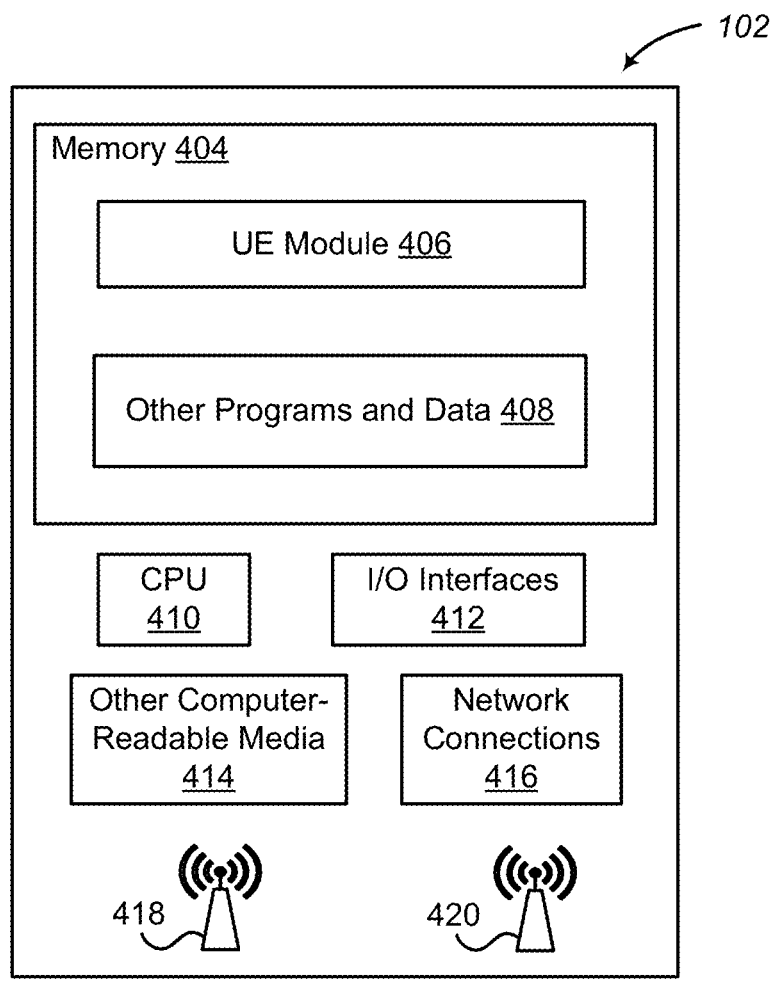
FIG. 4 is a block diagram illustrating an example of a User Equipment (UE) device in accordance with embodiments described herein.

FIG. 4 is a block diagram illustrating an example of a User Equipment (UE) device 102 in accordance with embodiments described herein. In some embodiments, one or more special-purpose computing systems may be used to implement the UE device 102. Accordingly, various embodiments described herein may be implemented in software, hardware, firmware, or in some combination thereof. The UE device 102 may include one or more memory devices 404, one or more central processing units (CPUs) 410, I/O interfaces 412, other computer-readable media 414, network connections 416, a radio transceiver 418, and a radio transceiver 420.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of random access memory (RAM), various types of read-only memory (ROM), a Multi-Universal Mobile Telecommunications System (UMTS) Subscriber Identity Module (MUSIM) card, other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein. In one or more implementations, the one or more CPUs 410 cause the UE device 102 to determine a network selection policy, which the UE device 102 uses to select a Public Land Mobile Network (PLMN), for example, when a handover of the UE device 102 is performed.

The one or more memory devices 404 may have stored thereon a UE module 406. The UE module 406 is configured to implement and/or perform some or all of the functions of the UE device 102 described herein and interface with the radio transceivers 418 and 420. The one or more memory devices 404 may also store other programs and data 408, which may include ATSSS rules, digital certificates, information regarding subscriber identification (e.g., from a MUSIM card included in the UE device 102), network protocols, O-RAN operating rules, user interfaces, operating systems, etc. In addition, the UE module 406 includes other modules, such as the transport layer module 102*a* and the ATSSS-LL module 102*b* discussed in connection with FIG. 1, for example.

Network connections 416 are configured to communicate with other computing devices including an eNB device or a gNB device, for example. The network connections 416 may be used to communicate User Plane (UP) and Control Plane (CP) information. The network connections 416 may be associated with logical channels between the Medium Access Control (MAC) sublayer of 5G NR protocol stack to the Radio Link Control (RLC) sublayer of 5G NR protocol stack, which carry CP information and UP information. Also, the network connections 416 may be associated with between the Physical (PHY) sublayer of 5G NR protocol stack to the MAC sublayer of 5G NR protocol stack, which describe how information is carried. Additionally, the network connections 416 may be associated with physical channels that carry information on an air interface provided by the radio transceiver 418.

The radio transceiver 418 transmits and receives signals in the 5G NR frequency bands, including the Frequency Range 1 (FR1) bands, which includes sub-6 GHz frequency bands, and Frequency Range 2 bands, which includes frequency bands from 24.25 GHz to 71.0 GHz. In one or more implementations, the radio transceiver 418 transmits and receives information using Multiple Input Multiple Output (MIMO) radio link technology. In one or more implementations, the radio transceiver 418 includes one or more oscillators, radio frequency (RF) filters, amplifiers, beamforming circuitry, and antennas arranged to perform 5G NR communications. In one or more implementations, the radio transceiver 418 simultaneously connects to multiple 3GPP network connections using multiple International Mobile Equipment Identifiers (IMEIs), each of which is associated with a particular subscriber profile included in the MUSIM.

The radio transceiver 420 transmits and receives signals in one or more frequency bands used for Wireless Local Area Network (WLAN) communications, including 2.4 GHZ frequency bands, 5 GHz frequency bands, and 6 GHz frequency bands. In one or more implementations, the radio transceiver 420 transmits and receives data according to the IEEE 802.11ax communication standard (e.g., Wi-Fi 4). In one or more implementations, the radio transceiver 418 connects to multiple non-3GPP networks connections using multiple IMEIs, each of which is associated with a particular subscriber profile included in the MUSIM.

Figure 5:
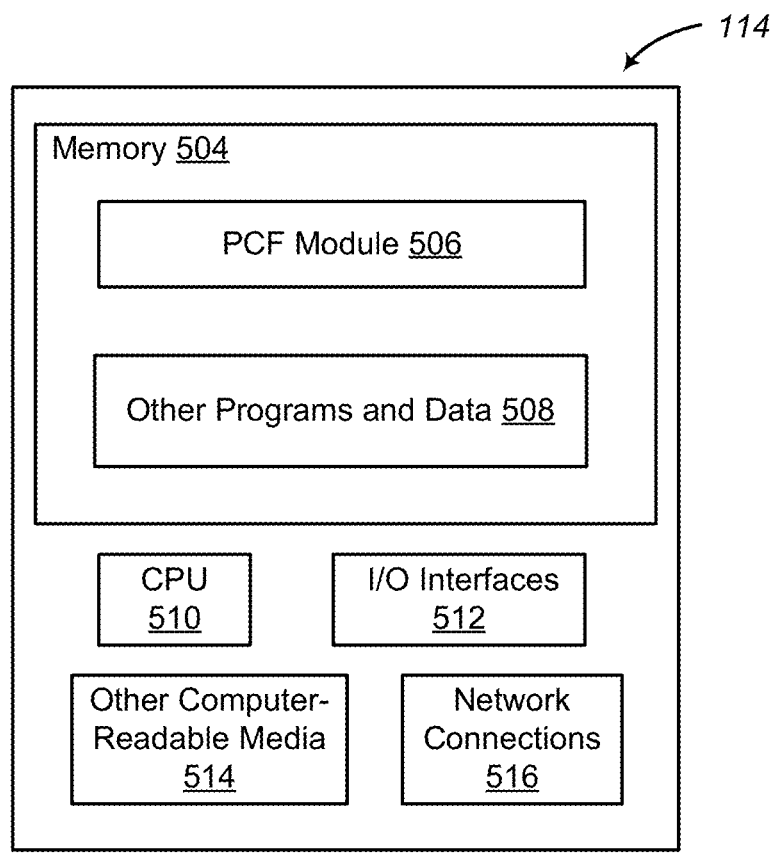
FIG. 5 is a block diagram illustrating an example of a Policy Control Function (PCF) device in accordance with embodiments described herein.

FIG. 5 is a block diagram illustrating an example of a Policy Control Function (PCF) device 114 in accordance with embodiments described herein. In some embodiments, one or more special-purpose computing systems may be used to implement the PCF device 114. Accordingly, various embodiments described herein may be implemented in software, hardware, firmware, or in some combination thereof. The PCF device 114 may include one or more memory devices 504, one or more central processing units (CPUs) 510, I/O interfaces 512, other computer-readable media 514, and network connections 516.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a PCF module 506. The PCF module 506 is configured to implement and/or perform some or all of the functions of the PCF device 114 described herein. The PCF module 506 is configured to perform PCF functions of a core 5G network, for example, as described in 3GPP Technical Specification (TS) 29.507, 3GPP TS 29.512, 3GPP TS 29.514, 3GPP TS 29.523, 3GPP TS 29.525, and 3GPP TS 29.554. The PCF device 114 interacts with various network functions to gather data used to formulate rules. More particularly, the PCF device 114 obtains subscription data from a 5G Unified Data Repository (UDR), current network conditions from 5G Network Data Analytics Function (NWDAF), and spending limits from a Charging Function (CHF). The PCF device 114 uses that data, along with predefined policies, to determine how a UE device (e.g., UE device 102) may behave as well as how Protocol Data Unit (PDU) sessions of the UE device may be handled.

The one or more memory devices 504 may also store other programs and data 508, which may include service information for generating ATSSS rules, network protocols, user interfaces, operating systems, etc.

Network connections 516 are configured to communicate with other computing devices in the 5G Network Core including a Session Management Function (SMF) device (e.g., SMF device 112-1) using an N7 interface. Also, the network connections 516 are configured to communicate with another PCF device using an N24 interface. Additionally, the network connections 516 are configured to communicate with an Access and Mobility Management Function (AMF) device (e.g., AMF device 106-1) using an N15 interface. In addition, the network connections 516 are configured to communicate with an Application Function (AF) device using an N5 interface. Father, the network connections 516 are configured to communicate with a Network Exposure Function (NEF)/Packet Flow Description Function (PFDF) device using an N30 interface.

FIG. 6 shows an example of service information that many be used to generate ATSSS rules in accordance with embodiments described herein. More particularly, FIG. 6 shows a table 600 including service information. The table 600 includes a first column with service identifier information, a second column with service type information, a third column with provider information, a fourth column with transport type information, a fifth column with destination port information, a sixth column with destination address information, and a seventh column with application type information. Each row of table 600 corresponds to a type of traffic. An asterisk in a cell of table 600 means that the information in that cell may have any value.

In the example of FIG. 6, there are three types of services defined, which have been assigned services identifiers of service-1, service-2, and service-3, respectively. Service-1 corresponds to a voice type of service, service-2 corresponds to a video streaming service, and service-3 corresponds to an Internet data type of service. The types of services shown in FIG. 6 are merely examples. Many other types of services may be defined according to the present disclosure. Also, the various types of traffic shown in FIG. 6 are merely examples. Many other types of traffic may be defined according to the present disclosure.

There are four types of traffic corresponding to the voice type of service in FIG. 6, including a first type of traffic that uses UDP as a transport type and has a destination port of Port-1, a second type of traffic that uses UDP as a transport type and has a destination port of Port-2, a third type of traffic that uses UDP as a transport type and has a destination address of Address-1, and fourth type of traffic that is transmitted to or from Application-1.

There are four types of traffic corresponding to the video streaming type of service in FIG. 6, including a first type of traffic that uses UDP as a transport type and has a destination port of Port-3, a second type of traffic that uses UDP as a transport type and has a destination port of Port-4, a third type of traffic that uses UDP as a transport type and has a destination address of Address-2, and fourth type of traffic that is transmitted to or from Application-2.

There are seven types of traffic corresponding to the Internet data type of service in FIG. 6, including a first type of traffic that uses UDP as a transport type and has a destination port of Port-5, a second type of traffic that uses TCP as a transport type and has a destination port of Port-5, a third type of traffic that uses UDP as a transport type and has a destination port of Port-6, a fourth type of traffic that uses TCP as a transport type and has a destination port of Port-6, a fifth type of traffic that uses UDP as a transport type and has a destination address of Address-3, a sixth type of traffic that uses TCP as a transport type and has a destination address of Address-3, and a seventh type of traffic is transmitted to or from Application-3.

FIG. 7 shows an example of that many be used to generate ATSSS rules that may be generated from the service information shown in FIG. 6 in accordance with embodiments described herein. More particularly, FIG. 7 shows a table 700 including ATSSS rules, wherein each row of the table 700 includes an ATSSS rule for a type of traffic defined in a corresponding row of the table 600 shown in FIG. 6. In one or more implementations, for the ATSSS rules shown in the table 700, 3GPP-1 may correspond to a Public Land Mobile Network (PLMN) used by a MNO, 3GPP-2 may correspond to a PLMN used by a first MNO (MVNO-1), and 3GPP-3 may correspond to a PLMN used by a second MVNO (MVNO-2).

Figure 8:
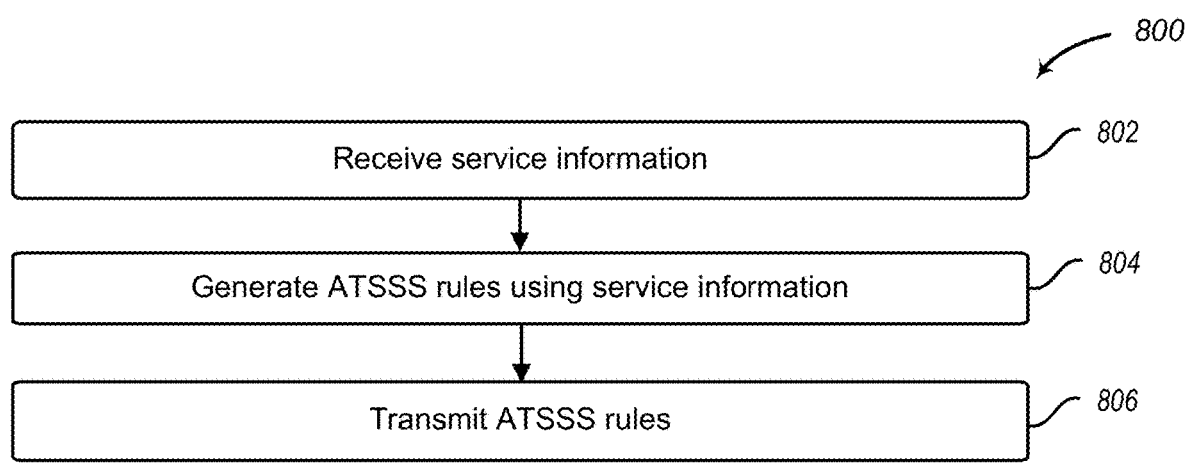
FIG. 8 illustrates a logical flow diagram showing an example of a method of operating a PCF device in accordance with embodiments described herein.

FIG. 8 illustrates a logical flow diagram showing an example of a method 800 of operating a Policy Control Function (PCF) device in accordance with embodiments described herein. The method 800 begins at 802.

At 802, a PCF device receive service information. For example, the PCF device 114-1 operated by the first MNO shown in FIG. 1 receives the service information shown in FIG. 6 from a service device (not shown) that includes a subscriber database. The method then proceeds to 804.

At 804, the PCF device generates a plurality of ATSSS rules using the service information received at 802. For example, the PCF device 114-1 operated by the first MNO shown in FIG. 1 generates the ATSSS rules shown in table 700 of FIG. 7. The method then proceeds to 806.

At 806, the PCF device transmits the ATSSS rules generated at 804. For example, the PCF device 114-1 operated by the first MNO shown in FIG. 1 transmits the ATSSS rules to the UE device 102 via the 3GPP access network 104-1 that is operated by the first MNO. In addition, the PCF device 114-1 operated by the first MNO shown in FIG. 1 transmits the ATSSS rules to the User Plane Function (UPF) device 116-1 via the Session Management Function (SMF) device 112-1 shown in FIG. 1. The method 800 then ends.

Figure 9:
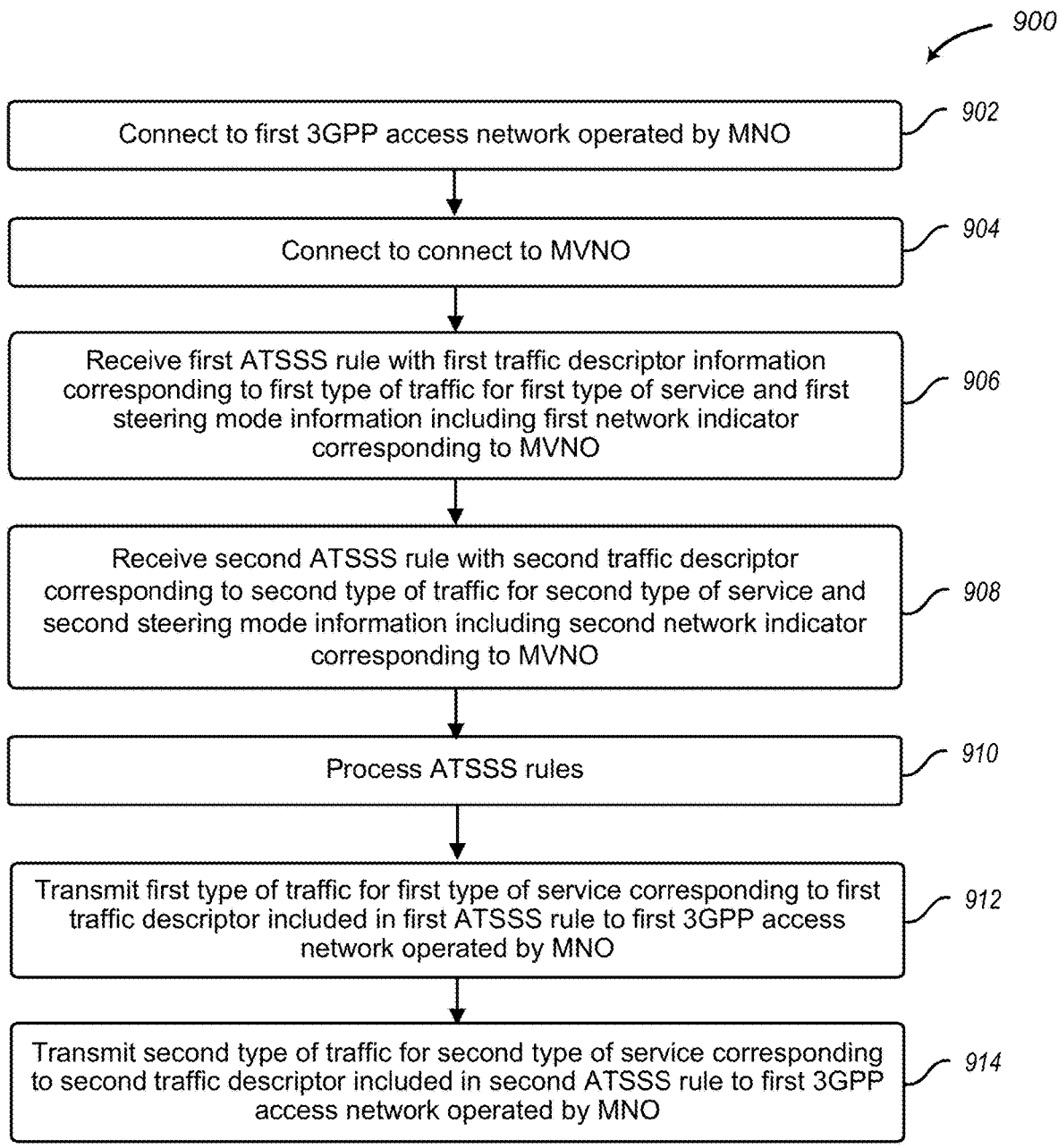
FIG. 9 illustrates a logical flow diagram showing an example of a method of operating a UE device in accordance with embodiments described herein.

FIG. 9 illustrates a logical flow diagram showing an example of a method 900 of operating a UE device in accordance with embodiments described herein. The method 900 begins at 902.

At 902, a User Equipment (UE) device connects to a 3GPP access network operated by a first mobile network operator (MNO). For example, the UE device 102 shown in FIG. 1 connects to the 3GPP access network 104-1 that is operated by a first MNO (e.g., DISH Network) using information included in a MUSIM (e.g., first authentication key, first International Mobile Subscriber Identity (IMSI), first Service Provider Name (SPN), etc. corresponding to a first subscriber profile included in the MUSIM). The method then proceeds to 904.

At 904, the User UE device connects to a first Mobile Virtual Network Operator (MVNO). For example, the UE device 102 shown in FIG. 1 connects to the MVNO-1 shown in FIG. 2, using information included in the MUSIM (e.g., second authentication key, second International Mobile Subscriber Identity (IMSI), second Service Provider Name (SPN), etc. corresponding to a second subscriber profile included in the MUSIM). The method then proceeds to 906.

At 906, the UE device receives a first Access Traffic Steering, Switching & Splitting (ATSSS) rule with first traffic descriptor information corresponding to a first type of traffic for a first type of service and first steering mode information including a first network indicator corresponding to the MNO. For example, the UE device 102 shown in FIG. 1 receives the first ATSSS rule from the Session Management Function (SMF) device 112-1 via the Access and Mobility Management Function (AMF) device 106-1. The method then proceeds to 908.

At 908, the UE device receives a second ATSSS rule with second traffic descriptor information corresponding to a second type of traffic for a second type of service and second steering mode information including a second network indicator corresponding to a Mobile Virtual Network Operator (MVNO). For example, the UE device 102 shown in FIG. 1 receives the second ATSSS rule from the SMF device 112-1 via the AMF device 106-1. The method then proceeds to 910.

At 910, the UE device processes the ATSSS rules received at 906 and 908. For example, the UE device 102 shown in FIG. 1 uses rule precedence information associated with each ATSSS rule to determine an order in which the ATSSS rules are evaluated, and then evaluates the rules. The method then proceeds to 912.

By way of example, if the first ATSSS rule is "Traffic Descriptor: UDP, DestPort Port-1", "Steering Mode: Active-Standby, Active=3GPP-2, Standby=3GPP-1", the UE device 102 determines that UDP traffic with destination IP Port Port-1 is to be steered to the active access (3GPP-2), if available; if the active access is not available, the UE device 102 determines that UDP traffic with destination IP Port Port-1 is to be steered to the standby access (3GPP-1). In one or more implementations, 3GPP-1 is a first PLMN corresponding to the MNO connected to at 902, and 3GPP-2 is a second PLMN corresponding to the MVNO connected to at 904.

By way of another example, if the second ATSSS rule is "Traffic Descriptor: UDP, DestPort Port-3", "Steering Mode: Active-Standby, Active=3GPP-1, Standby=3GPP-2", the UE device 102 determines that UDP traffic with destination IP Port Port-3 is to be steered to the active access (3GPP-2), if available; if the active access is not available, the UE device 102 determines that UDP traffic with destination IP Port Port-1 is to be steered to the standby access (3GPP-1). In one or more implementations, 3GPP-1 is a first PLMN corresponding to the MNO connected to at 902, and 3GPP-2 is a second PLMN corresponding to the MVNO connected to at 904.

At 912, the UE device transmits the first type of traffic for the first type of service corresponding to the first traffic descriptor included in the first ATSSS rule received at 906 to first 3GPP access network operated by the MNO based on the processing performed at 910. For example, the UE device 102 shown in FIG. 2 transmits the first type of traffic for the first type of service to the 3GPP access network 204 operated by the MNO, which forwards the first type of traffic for the first type of service to the 5G network 206 operated by the MVNO-1. The method 900 then proceeds to 914.

At 914, the UE device transmits the second type of traffic for the second type of service corresponding to the second traffic descriptor included in the second ATSSS rule received at 908 to the second MVNO via first 3GPP access network operated by the MNO based on the processing performed at 910. For example, the UE device 102 shown in FIG. 2 transmits the second type of traffic for the second type of service to the 3GPP access network 204 operated by the MNO. The method 900 then ends.

Figure 10:
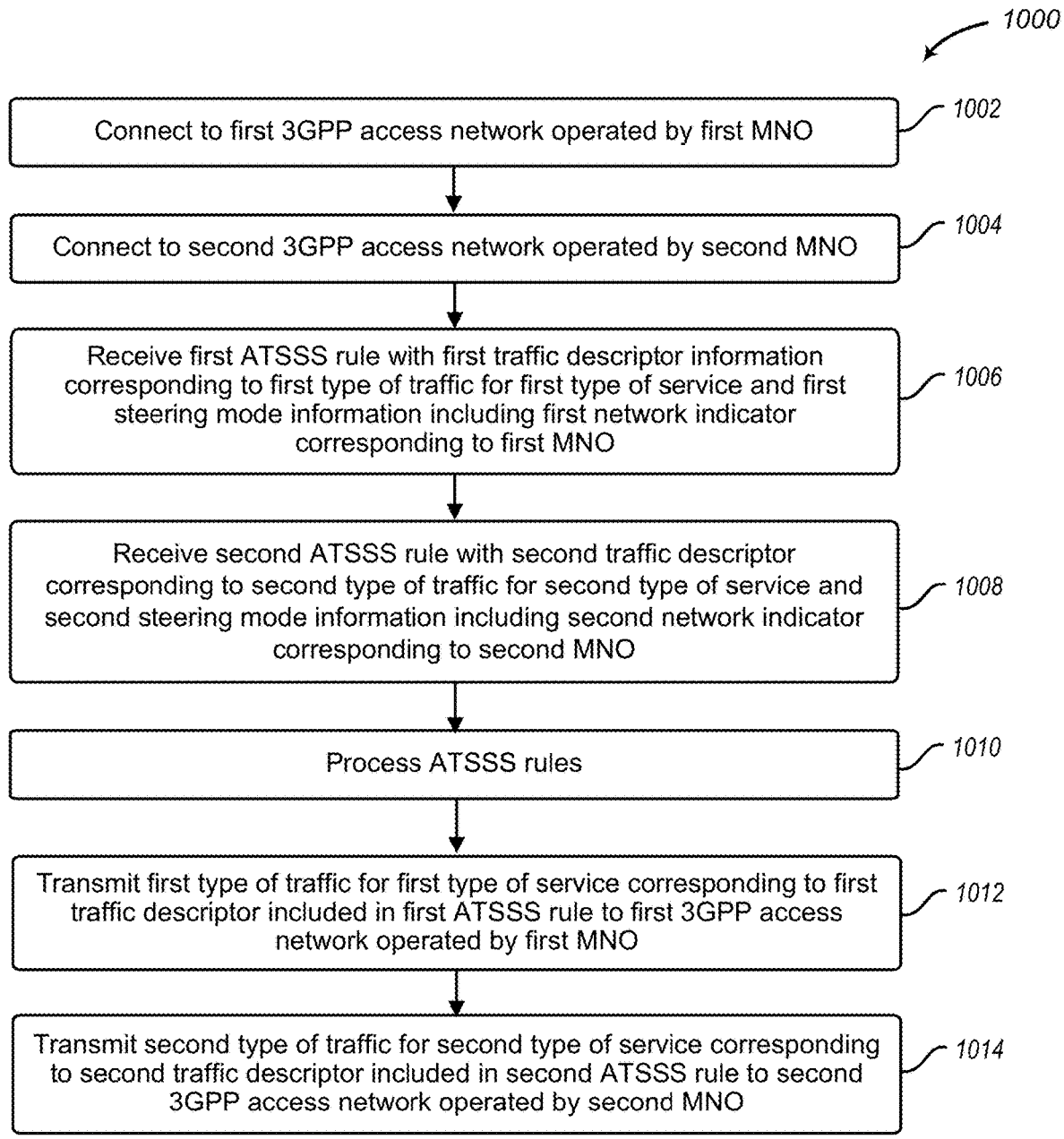
FIG. 10 illustrates a logical flow diagram showing an example of another method of operating a UE device in accordance with embodiments described herein.

FIG. 10 illustrates a logical flow diagram showing an example of a method 1000 of operating a UE device in accordance with embodiments described herein. The method 1000 begins at 1002.

At 1002, a User Equipment (UE) device connects to a first 3GPP access network operated by a first mobile network operator (MNO). For example, the UE device 102 shown in FIG. 1 connects to the 3GPP access network 104-1 that is operated by a first MNO (e.g., Verizon) using information included in a MUSIM (e.g., first authentication key, first International Mobile Subscriber Identity (IMSI), first Service Provider Name (SPN), etc. corresponding to a first subscriber profile included in the MUSIM). The method then proceeds to 1004.

At 1004, the User UE device connects to a second MNO. For example, the UE device 102 shown in FIG. 1 connects to the 3GPP access network 104-2 that is operated by a second MNO (e.g., T-Mobile) using information included in the MUSIM (e.g., second authentication key, second International Mobile Subscriber Identity (IMSI), second Service Provider Name (SPN), etc. corresponding to a second subscriber profile included in the MUSIM). The method then proceeds to 1006.

At 1006, the UE device receives a first Access Traffic Steering, Switching & Splitting (ATSSS) rule with first traffic descriptor information corresponding to a first type of traffic for a first type of service and first steering mode information including a first network indicator corresponding to the first MNO. For example, the UE device 102 shown in FIG. 1 receives the first ATSSS rule from the Session Management Function (SMF) device 112-1 via the Access and Mobility Management Function (AMF) device 106-1. The method then proceeds to 1008.

At 1008, the UE device receives a second ATSSS rule with second traffic descriptor information corresponding to a second type of traffic for a second type of service and second steering mode information including a second network indicator corresponding to the second MNO. For example, the UE device 102 shown in FIG. 1 receives the second ATSSS rule from the SMF device 112-1 via the AMF device 106-1. The method then proceeds to 1010.

At 1010, the UE device processes the ATSSS rules received at 1006 and 1008. For example, the UE device 102 shown in FIG. 1 uses rule precedence information associated with each ATSSS rule to determine an order in which the ATSSS rules are evaluated, and then evaluates the rules. The method then proceeds to 1012.

By way of example, if the first ATSSS rule is "Traffic Descriptor: UDP, DestPort Port-1", "Steering Mode: Active-Standby, Active=3GPP-1, Standby=3GPP-2", the UE device 102 determines that UDP traffic with destination IP Port Port-1 is to be steered to the active access (3GPP-1), if available; if the active access is not available, the UE device 102 determines that UDP traffic with destination IP Port Port-1 is to be steered to the standby access (3GPP-1). In one or more implementations, 3GPP-1 is a first PLMN corresponding to the first MNO connected to at 1002, and 3GPP-2 is a second PLMN corresponding to the second MNO connected to at 1004.

By way of another example, if the second ATSSS rule is "Traffic Descriptor: UDP, DestPort Port-3", "Steering Mode: Active-Standby, Active=3GPP-2, Standby=3GPP-1", the UE device 102 determines that UDP traffic with destination IP Port Port-3 is to be steered to the active access (3GPP-2), if available; if the active access is not available, the UE device 102 determines that UDP traffic with destination IP Port Port-1 is to be steered to the standby access (3GPP-1). In one or more implementations, 3GPP-1 is a first PLMN corresponding to the first MNO connected to at 1002, and 3GPP-2 is a second PLMN corresponding to the second MNO connected to at 1004.

At 1012, the UE device transmits a first type of traffic for a first type of service corresponding to the first traffic descriptor included in the first ATSSS rule received at 1006 to the first 3GPP access network operated by the first MNO based on the processing performed at 1010. For example, the UE device 102 shown in FIG. 1 transmits the first type of traffic for the first type of service to the 3GPP access network 104-1 operated by the first MNO. The method 1000 then proceeds to 1014.

At 1014, the UE device transmits a second type of traffic for a second type of service corresponding to the second traffic descriptor included in the second ATSSS rule received at 1008 to the second 3GPP access network operated by the second MNO based on the processing performed at 1010. For example, the UE device 102 shown in FIG. 2 transmits the second type of traffic for the second type of service to the 3GPP access network 104-2 operated by the second MNO. The method 1000 then ends.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, by a user device, a first ATSSS (Access Traffic Steering, Switching & Splitting) rule that includes a first traffic descriptor for a first type of traffic that identifies a first service type, a first mobile network operator, a first transport type, a first destination port, a first destination address, and a first application type;
   receiving, by the user device, a second ATSSS rule that includes a second traffic descriptor for a second type of traffic that identifies a second service type, a second mobile network operator, a second transport type, a second destination port, a second destination address, and a second application type;
   receiving, by the user device, a third ATSSS rule that includes a third traffic descriptor for a third type of traffic that identifies a third service type, a third mobile network operator, a third transport type, a third destination port, a third destination address, and a third application type, wherein the first service type, the second service type, and the third service type are separately one of voice, video streaming or internet data, wherein the first transport type, the second transport type, and the third transport type are separately one of User Datagram Protocol (UDP) or Transmission Control Protocol (TCP), wherein the first application type, the second application type, and the third application type are separately a type an application from which traffic is transmitted or to which traffic is transmitted;
   determining, by the user device, whether the user device has the first type of traffic to transmit, the second type of traffic to transmit, or the third type of traffic to transmit;
   in response to determining that the user device has the first type of traffic to transmit, transmitting, by the user device, the first type of traffic to a cellular network operated by the first mobile network operator based on the first ATSSS rule;
   in response to determining that the user device has the second type of traffic to transmit, transmitting, by the user device, the second type of traffic to the cellular network operated by the second mobile network operator based on the second ATSSS rule; and
   in response to determining that the user device has the third type of traffic to transmit, transmitting, by the user device, the third type of traffic to the cellular network operated by the third mobile network operator based on the third ATSSS rule.

2. The method of claim 1, wherein the third mobile network operator is the first mobile network operator.

3. The method of claim 1, wherein the third mobile network operator is the second mobile network operator.

4. The method of claim 1, receiving the first ATSSS rule comprises:
   receiving steering mode information indicating the first mobile network operator.

5. The method of claim 1, receiving the second ATSSS rule comprises:
   receiving steering mode information indicating the second mobile network operator.

6. The method of claim 1, receiving the third ATSSS rule comprises:
   receiving steering mode information indicating the third mobile network operator.

7. The method of claim 1, wherein the third service type is the first service type.

8. The method of claim 1, wherein the first service type and the second service type are different.

9. The method of claim 1, wherein the first type of traffic and the second type of traffic are different.

10. A user device, comprising:
    at least one memory configured to store computer instructions; and
    at least one processor configured to execute the computer instructions to:
       receive a first ATSSS (Access Traffic Steering, Switching & Splitting) rule that includes a first traffic descriptor for a first type of traffic that identifies a first service type, a first mobile network operator, a first transport type, a first destination port, a first destination address, and a first application type;
       receive a second ATSSS rule that includes a second traffic descriptor for a second type of traffic that identifies a second service type, a second mobile network operator, a second transport type, a second destination port, a second destination address, and a second application type;
       receive a third ATSSS rule that includes a third traffic descriptor third type of traffic that identifies a third service type, a third mobile network operator, a third transport type, a third destination port, a third destination address, and a third application type, wherein the first service type, the second service type, and the third service type are separately one of voice, video streaming or internet data, wherein the first transport type, the second transport type, and the third transport type are separately one of User Datagram Protocol (UDP) or Transmission Control Protocol (TCP), wherein the first application type, the second application type, and the third application type are separately a type an application from which traffic is transmitted or to which traffic is transmitted;

determine whether the user device has the first type of traffic to transmit, the second type of traffic to transmit, or the third type of traffic to transmit;

in response to determining that the user device has the first type of traffic to transmit, transmit the first type of traffic to a cellular network operated by the first mobile network operator based on the first ATSSS rule;

in response to determining that the user device has the second type of traffic to transmit, transmit the second type of traffic to the cellular network operated by the second mobile network operator based on the second ATSSS rule; and in response to determining that the user device has the third type of traffic to transmit, transmit the third type of traffic to the cellular network operated by the third mobile network operator based on the third ATSSS rule.

11. The computing device of claim 10, wherein the third mobile network operator is the first mobile network operator.

12. The computing device of claim 10, wherein the third mobile network operator is the second mobile network operator.

13. The computing device of claim 10, wherein the at least one processor receives the first ATSSS rule by being configured to execute the computer instructions to:
receive steering mode information indicating the first mobile network operator.

14. The computing device of claim 10, wherein the at least one processor receives the second ATSSS rule by being configured to execute the computer instructions to:
receive steering mode information indicating the second mobile network operator.

15. The computing device of claim 10, wherein the at least one processor receives the third ATSSS rule by being configured to execute the computer instructions to:
receive steering mode information indicating the third mobile network operator.

16. The computing device of claim 10, wherein the third service type is the first service type.

17. The computing device of claim 10, wherein the first service type and the second service type are different.

18. A non-transitory computer-readable storage medium that stores instructions that, when executed by a processor in a user device, cause the processor to perform actions, the actions comprising:
receiving a first ATSSS rule that includes a first traffic descriptor for a first type of traffic that identifies a first service type, a first mobile network operator, a first transport type, a first destination port, a first destination address, and a first application type;

receiving a second ATSSS rule that includes a second traffic descriptor for a second type of traffic that identifies a second service type, a second mobile network operator, a second transport type, a second destination port, a second destination address, and a second application type;

receiving a third ATSSS rule that includes a third traffic descriptor third type of traffic that identifies a third service type, a third mobile network operator, a third transport type, a third destination port, a third destination address, and a third application type, wherein the first service type, the second service type, and the third service type are separately one of voice, video streaming or internet data, wherein the first transport type, the second transport type, and the third transport type are separately one of User Datagram Protocol (UDP) or Transmission Control Protocol (TCP), wherein the first application type, the second application type, and the third application type are separately a type an application from which traffic is transmitted or to which traffic is transmitted;

determining whether the user device has the first type of traffic to transmit, the second type of traffic to transmit, or the third type of traffic to transmit;

in response to determining that the user device has the first type of traffic to transmit, transmitting the first type of traffic to a cellular network operated by the first mobile network operator based on the first ATSSS rule;

in response to determining that the user device has the second type of traffic to transmit, transmitting the second type of traffic to the cellular network operated by the second mobile network operator based on the second ATSSS rule; and in response to determining that the user device has the third type of traffic to transmit, transmitting the third type of traffic to the cellular network operated by the third mobile network operator based on the third ATSSS rule.

* * * * *